T. T. BATHURST.

SPARK PLUG.

APPLICATION FILED AUG. 27, 1921.

Reissued Jan. 31, 1922. 15,276.

Inventor

Thomas T. Bathurst.

By Knight Bros.

Attorneys

UNITED STATES PATENT OFFICE.

THOMAS T. BATHURST, OF KANSAS CITY, MISSOURI, ASSIGNOR TO BATHURST MANUFACTURING COMPANY, OF KANSAS CITY, MISSOURI, A CORPORATION.

SPARK PLUG.

15,276. Specification of Reissued Letters Patent. Reissued Jan. 31, 1922.

Original No. 1,384,818, dated July 19, 1921, Serial No. 344,717, filed December 13, 1919. Application for reissue filed August 27, 1921. Serial No. 496,142.

*To all whom it may conern:*

Be it known that I, THOMAS T. BATHURST, a citizen of the United States, and resident of Kansas City, in the county of Jackson and State of Missouri, have invented certain new and useful Improvements in Spark Plugs, of which the following is a specification.

This invention relates to spark plugs in general, but, in some of its features, has special applicability to the class of so-called self-cleaning spark plugs which are provided with means whereby cleaning fluid (which may be the fuel itself) may be passed over and around the electrodes without removing the plug from the engine.

The invention has for an object an improved construction of spark plug which will lend itself more readily than known constructions to inspection of the sparking points and porcelains; to cleaning of the same, whether by the self-cleaning method mentioned above, or by direct manual application to the faulty part; and to priming through the spark plug, making priming cups unnecessary.

Further objects and advantages attained by my invention, and novel details of construction, will be noted in the course of the following description of a preferred embodiment of my invention. It will be readily understood that in many details change of form and proportion may be made without departing from the spirit of the invention.

Figure 1:
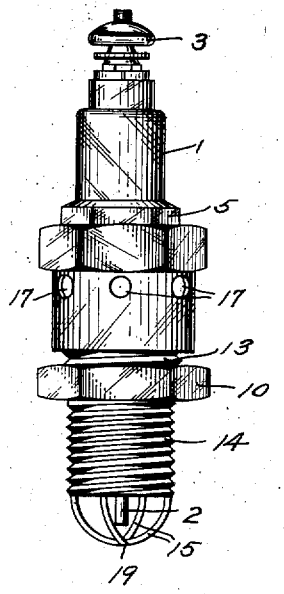
Fig. 1 is an external view of a spark plug, constructed in accordance with my invention.
Figure 2:
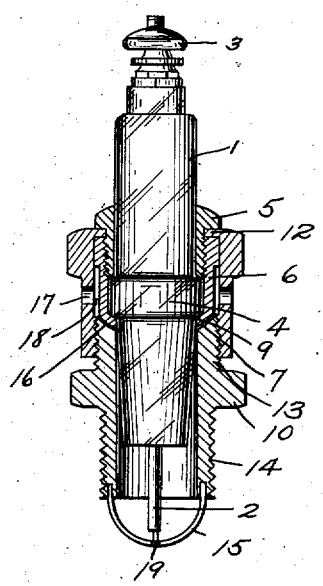
Fig. 2 is a central sectional view, the porcelain being shown in elevation.
Figure 3:
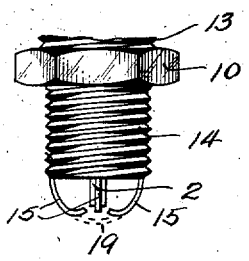
Fig. 3 is a fragmentary view of one part of the spark plug, showing the sparking points modified in a manner to be hereinafter described.

Referring now to the drawings in detail, 1 represents the porcelain, which may be of any usual or suitable construction; as shown, an electrode 2 extends longitudinally through the porcelain and is threaded at its upper end to receive binding nut 3, and at its lower end projects a short distance below member 10. Intermediate its ends, porcelain 1 is provided with the usual enlargement or base 4, upon which are clamped the externally threaded packing nut 5 and internally threaded draw nut 6, the latter having an annular flange 7 engaging the underside of base 4. Preferably copper gaskets 8 and 9 are interposed between the base 4 and the nuts 5, 6, respectively. It is an important consequence of the construction hereinafter referred to, that the tight clamping engagement of the nuts 5, 6, with the base 4 of the porcelain need never be disturbed unless it becomes necessary to renew the porcelain. It is well known that the seating of the porcelain in the metal parts which support it should be permanent, if possible, in view of the fact that it is a difficult matter to reseat the porcelain without subjecting it to strain.

Referring now to the shell of my improved spark plug, it will be noted that it is made up of a lower member 10 and an upper member 11. The upper member 11 is of the character of a draw nut, having an annular flange 12 loosely fitting in the space between nuts 5, 6, and an internal thread on its lower portion. The lower member 10 comprises a central polygonal nut portion and upper and lower externally threaded extensions 13, 14. The threaded extension 13 engages the threaded portion of upper member 11, and the extension 14 is adapted to be screwed into the usual socket openings of an internal combustion engine (not shown).

Coacting with central electrode 2 are a pair of electrodes 15, 15, formed of pieces of wire bent into semi-circular shape and having their ends embedded in the member 10. The normal sparking point for the electrodes 15, 15 is at their intersection 19, but in the event that the electrodes 15, 15 become burned out at the intersection 19, the shortened pieces of wire may be bent inwardly and upwardly toward electrode 2 in order to readjust the spark gap.

The upper lip 16 of member 10 is shaped to conform to the flange 7, the former thus constituting a seat for the latter when the parts are drawn together in the manner hereinafter referred to. A packing ring of any suitable material may be interposed between flange 7 and seat 16.

The side wall of member 11 is pierced by a series of holes 17, which thus establish communication between the atmosphere and annular recess 18, formed by reducing the outside diameter of draw nut 6 adjacent said holes. The holes 17 should be positioned sufficiently high up on member 11 so that they will not be masked by the member 10 when the two members are drawn together.

I will now describe the manner in which my improved spark plug operates and may be manipulated in realizing the objects of invention recited above.

The spark plug, as above described, is separable into two parts by rotating the member 11 on the member 10. That is to say, the porcelain, together with the central electrode, binding nut, clamping nuts 5, 6, and member 11, can be withdrawn from member 10. It is desirable to effect this separation prior to inserting the plug in the engine, as one is thus enabled to apply a heavy wrench to the part 10 and screw it firmly into the engine socket without danger to the porcelain in case the wrench should slip. When plug member 10 is in place, the porcelain with its connected parts may be inserted and firmly united with member 10 by screwing member 11 down tightly. As thus assembled, a unitary spark plug is constituted, having a strong protective shell comprising the elements 10, 11, 5, 6, this shell being made perfectly air-tight by reason of the close seating of flange 7 on the seat 16.

For priming or for cleaning the sparking points, the member 11 is unscrewed a few turns, whereupon the flange 12, acting against the head of nut 5, will lift the porcelain 1 and raise the flange 7 off the seat 16. The parts are shown in this relation in Fig. 11, and it will be seen that fuel or cleaning fluid may be introduced into the cylinder of the engine, passing over the sparking points, by way of the holes 17, recess 18, valve 7, 16, and bore of member 10. Similarly, the engine can be permitted to exhaust through the same passage if it is desired to blow out, in this way, accumulations of carbon or other extraneous matter on the electrodes or porcelain.

If it is desired to inspect the sparking points or to test the porcelain or clean it manually, the member 11 may be entirely unscrewed and lifted off the plug 10, leaving the latter in the engine. In doing this it will not be necessary to disconnect the wires from the binding post, inasmuch as the member 11 can be rotated independently of the porcelain.

When the porcelain with its connected parts has been withdrawn, the lower half of the porcelain, below its base 4, will be exposed, thus permitting the surface of this part, which is exposed to the explosions of the engine, to be manually cleaned. Also, the porcelain can be effectively tested for fractures below the base 4, an operation which cannot be satisfactorily accomplished in spark plugs of known types without unseating the porcelain, the lower end of which is usually inaccessible by reason of its being surrounded by the lower part of the shell.

Claims:

1. In a spark plug, the combination with a central insulating electrode holder, of a hollow socket member, a draw nut rotatably connected with said electrode holder and having threaded engagement with said socket member, coacting valve seats on said electrode holder and said socket member, respectively, a recess between said draw nut and said electrode holder, said recess being contiguous to said valve seats, and ports establishing communication between said recess and atmosphere.

2. A spark plug according to claim 1, in which the ports are located in the side of the draw nut.

3. In a spark plug, the combination of a shell, a central electrode supported in said shell and having its lower end projecting below said shell, and a second electrode, comprising an arched wire having its ends secured to said shell and its midportion at the sparking distance from said central electrode.

4. A spark plug comprising a central insulating electrode holder, a hollow socket member, a member rotatably secured to said electrode holder, said electrode holder being formed so as to provide an air space between it and the rotatable member, said rotatable member adapted to separately unite said holder and hollow socket member.

5. A spark plug comprising a core of insulating material carrying one electrode, a holder for said core adapted to engage the core intermediate its ends, a hollow socket member, said core having its lower end reduced to provide an annular space between it and the socket member, a rotatable member for uniting said holder with said socket member, said holder being shaped so as to provide an air space between it and said rotatable member.

6. A spark plug comprising a central insulating electrode holder, a hollow socket member, an independently rotatable member mounted on said electrode holder for uniting said holder with said socket member, said electrode holder being reduced to form an annular recess and said rotatable member having ports establishing communication between said recess and the atmosphere.

THOMAS T. BATHURST.